United States Patent [19]

Red et al.

[11] Patent Number: 4,831,549
[45] Date of Patent: May 16, 1989

[54] DEVICE AND METHOD FOR CORRECTION OF ROBOT INACCURACY

[75] Inventors: Walter E. Red, Provo; Brady R. Davies, Orem; Xuguang Wang; Edgar R. Turner, both of Provo, all of Utah

[73] Assignee: Brigham Young University, Provo, Utah

[21] Appl. No.: 79,168

[22] Filed: Jul. 28, 1987

[51] Int. Cl.[4] .................. G06F 15/46; G05B 19/42
[52] U.S. Cl. .................. 364/513; 364/167.01; 901/2; 901/16
[58] Field of Search .................. 364/513, 167, 191; 318/568; 901/9, 16, 2

[56] References Cited

U.S. PATENT DOCUMENTS

| | | | |
|---|---|---|---|
| 4,362,977 | 12/1982 | Evans et al. | 364/513 |
| 4,481,592 | 11/1984 | Jacobs et al. | 364/513 |
| 4,562,391 | 12/1985 | Inoue | 901/9 |
| 4,587,618 | 5/1986 | Oguchi | 901/9 |
| 4,590,578 | 5/1986 | Barto, Jr. et al. | 364/513 |
| 4,613,943 | 9/1986 | Miyake et al. | 364/513 |
| 4,616,326 | 10/1986 | Meier et al. | 364/167 |
| 4,642,781 | 2/1987 | Szonyi | 364/513 |
| 4,670,849 | 6/1987 | Okada et al. | 364/513 |

Primary Examiner—Jerry Smith
Assistant Examiner—Paul Gordon
Attorney, Agent, or Firm—Thorpe, North & Western

[57] ABSTRACT

A method and device for improving orientation and/or location accuracy of a programmable robot with respect to a target object. The method consists of calibrating the position of a terminal control frame associated with a robot end-effector which is coupled to a robot distal link. Separated reference positions external from the robot are identified, as to geometry and spatial data. This identification data is stored for later recall and comparison for use in determining a localized relative frame of reference. The robot end-effector is moved to a first reference position and a rigid body error correction is determined. This correction is stored in computer memory for application to later computer movement.

15 Claims, 7 Drawing Sheets

Robot Inaccuracy

| index | d(in) | Δx(in) | Δy(in) | e(in) | Δθ(°) |
|---|---|---|---|---|---|
| 1 | 5.000 | -0.00100 | -0.00806 | 0.00866 | -0.18189 |
| 2 | 10.000 | -0.00465 | -0.01223 | 0.01308 | -0.59117 |
| 3 | 11.180 | 0.00211 | -0.01189 | 0.01208 | 0.05415 |
| 4 | 14.142 | 0.00873 | -0.01482 | 0.01720 | 0.08954 |
| 5 | 11.180 | 0.01187 | -0.00961 | 0.01527 | -0.17764 |
| 6 | 10.000 | 0.01287 | -0.00330 | 0.01329 | -0.64040 |
| 7 | 5.000 | 0.00546 | -0.00181 | 0.00575 | -0.72860 |
| 8 | 7.071 | 0.00467 | -0.01026 | 0.01127 | -0.21365 |

Error correction with orientation correction

| index | d(in) | Δx(in) | Δy(in) | e(in) | Δθ(°) | type |
|---|---|---|---|---|---|---|
| 1 | 5.000 | 0.00008 | 0.00126 | 0.00126 | 0.15870 | feature |
| 2 | 10.000 | -0.00060 | -0.00076 | 0.00097 | 0.03391 | feature |
| 3 | 11.180 | 0.00088 | -0.00153 | 0.00177 | 0.98821 | feature |
| 4 | 14.142 | 0.00175 | 0.00186 | 0.00255 | 1.35796 | feature |
| 5 | 11.180 | 0.00183 | -0.00109 | 0.00213 | 0.65912 | feature |
| 6 | 10.000 | -0.00070 | -0.00099 | 0.00121 | -0.05611 | feature |
| 7 | 5.000 | -0.00018 | 0.00070 | 0.00072 | -0.30861 | feature |
| 8 | 7.071 | 0.00086 | -0.00079 | 0.00117 | 0.46107 | feature |

DEVICE AND METHOD FOR CORRECTION OF ROBOT INACCURACY

BACKGROUND OF THE INVENTION

1. Field of Invention:

The present invention relates to a device and method for enabling off-line programming of robot tasks. More particularly, the present invention relates to a method of mapping and accommodating robot inaccuracy which enables off-line programming with a high degree of accuracy and flexibility with respect to robot tasks being performed.

2. Prior Art

Robot mechanisms are being increasingly used within the manufacturing industry for performing repetitive tasks in an assembly line configuration. Such use of robots extends from automobile production lines to manufacture of microchips within the computer industry. At present, the primary factor limiting increased market expansion of robotics is the inability of conventional robot systems to perform within very limited tolerances. Inherent robot inaccuracy is a major contributor to this obstacle and has been the object of investigation for many years.

Robot inaccuracy describes the inability of a robot to move to a command pose, defined by position and/or orientation, within the working volume of the robot. For example, a robot control program may direct the movement of a robot arm to a specific point in space based on mechanical specifications of the robot structure and a perceived reference frame to which the robot is oriented. Despite the best of care in manufacture and positioning, however, actual performance of the commanded movement will not place the robot arm precisely at the desired location and/or orientation. This condition, known as robot inaccuracy, is the result of our inability to manufacture and assemble each of the respective robot components to conform to a perfect or ideal robot model. Instead, slight deviations in component length, compliance under stress, imperfect gear matching, and a host of other structural limitations contribute to robot task performance inconsistent with ideal mathematical models. Accordingly, the existence of robot inaccuracy has posed a major obstacle with respect to preprogramming robot movement within a task oriented work cell. Simply stated, the inability to predict the exact position or movement of a robot limits the ability to preprogram an exact path of robot movement. Accordingly, industry has had to turn to alternative forms of programming of robot task performance, despite the numerous advantages that off-line programming offers.

Two of the principal alternative methods for programming robots include the use of sensory systems and teach pendant methods. The teach pendant programming method is the dominant process applied in current robotics relating to performance of a repetitive task. This method is accomplished by leading the robot through a series of necessary intermediate configurations or joint states and then storing such joint states in a robot computer memory. Because the robot is able to reproduce these configurations or joint states, based on the stored data, the robot task can be performed within customary tolerance limits. The end result is that the robot is "taught" the exact task to be performed along a dictated path of movement. The control driver of the robot simply reproduces the sequence of joint states and movements which were programmed by the teach pendant method.

A number of serious limitations exist with respect to this form of robot task programming. For example, programs the same model. In fact, each separate robot has distinct structural and manufacturing deviations due to joint misalignment, joint compliance, gear train errors, standard tolerance deviations, etc. In addition, complex paths of movement may require many intermediate joint poses which are very tedious to program and usually inefficient in operation. Furthermore, robot movement paths in a dynamic or congested work space can be very difficult to teach. In addition, the probability of inadvertent collision with work space hardware is greatly increased.

From a practical point of view, teach pendant methods severely limit the flexibility of robot task performance in an assembly line operation. For example, unacceptable deviations or changes in task performance require the total assembly line to be shut down, even though modification of only one robot element is required. Where robots perform many assembly line tasks, lost production time due to required reprogramming by teach pendant methods can be very costly. Such teach pendant programming must be practiced in the actual work cell because any attempt to move the robot following programming results in changed frames of reference with a concurrent loss of orientation. It is well known to those skilled in the art that these teach pendant limitations consume numerous hours of personnel time and severely constrain the utility of robot task performance within many lines of manufacture.

A second method of robot programming depends on the use of sensor systems to move the robot end-effectors into appropriate interaction with a target object or other feature. This method is typically used when the object parts in the work cell are not delivered in the same orientation or position, or such part has some physical characteristic which is dynamically changing. In this instance, the ability of the robot to repeat actual movements offers no flexibility to adapt to parts with new orientations or position. Accordingly, the sensing device such as a camera or imaging system may be coupled to the distal link of the robot and may be programmed to adapt robot movements in response to a servo system which directs the robot to a detected target location. Unfortunately, sensory guide systems are extremely expensive and require special fixtures, substantial computer support and extensive programming effort. Therefore, economic limitations have severely limited commercial applications for sensor drive systems in robotics.

In addition, several hybrid approaches of these two methods have been applied. For example, in some tasks most global moves may be taught by teach pendant methods, whereas movements within localized areas are accomplished with sensor systems. In other tasks, sensor systems may be used to recognize small deviations in part delivery, with the teach pendant method being applied to maintain the deviated path. This method adapts the robot for changes in the rigid body pose of the part, but is only effective if the part experiences small changes or if the task does not demand tight robot-part interaction tolerances.

In summary, it is apparent that robot repeatability and robot inaccuracy constitute positioning factors which pose critical limitations to the programming of robots.

The on-line teach pendant mode utilizes robot repeatability to overcome the robot inaccuracy problem, but is severely limited in its flexibility and requires expensive tooling and an on-going commitment of personnel time. Sensor based systems use feedback to overcome repeatability and accuracy limitations, but are complicated and require significant computational power which tends to slow the process and reduce reliability.

These limitations have prompted further research and development in an effort to realize a more flexible robot application which can accommodate changes in work cell, including variations in part delivery, work cell operating environments and varying throughput demands. Although some attempts have been made to build reference frames which serve as a basis for manipulating robot movement, such reference frames have relied on global techniques, as opposed to localized task areas. Global methods seek to determine the robot inaccuracy over the entire working volume of the robot and use modeling methods to predict or measure kinematic and dynamic hardware sources of robot error. For example, such errors include improper orientations, errors in joint location, transmission system errors, robot compliance under loads, encoder sensor reading error, etc. Once these errors are determined, the methods suggest that mathematical correction models can be implemented to correct the deviations from the ideal robot model.

Such global techniques have not proved successful for measurement of robot inaccuracy because they attempt to accurately define a specific point in space, and then attempt to conform the robot path to that point. Such steps require a knowledge of the exact robot base reference frame is located relative to the robot chassis. This concept is difficult to manage because it is an imaginary rather than actual physical position on the robot. In addition, the complexity of defining given points in a global environment becomes unmanageable. The complexity of programming, the extensive memory storage requirements and the experimental complexity have frustrated all attempts to make global methods the basis for accommodating changes in robot characteristics and robot inaccuracy.

Other related approaches for improvement in robot accuracy have included definition of the kinematic parameters of the robot, with an attempt to compensate in software for any kinematic error. Hayati, S., "Robot Arm Geometric Link Parameter Estimation," Proceedings of the 22nd IEEE Conference on Decision and Control, pp. 1477-1483, December 1983. Other researchers have shown that joint axis misalignment can greatly affect robot positioning accuracy and have developed methods to identify axis position and orientation errors. Mooring, B. W., "An Improved Method for Identifying the Kinematic Parameters in a Six Axis Robot," Texas A & M University. These simulation methods have not fully accounted for measurement error. Furthermore, these measurements have been conducted in global coordinates. Other published literature presents an improved and involved calibration method but still does not overcome measurement errors necessary to achieve acceptable accuracy data. Whitney, D. E., C. A. Lozinski, and J. M. Rourke, "Industrial Robot Calibration Method and Results," Proceedings of the ASME on Computers in Engineering Conference, pp. 92-100, Las Vegas, Nev., August, 1984. Finally, attempts have been made to define a mathematical model which would allow the robot controller to compensate for second order non-linear kinematic effects; however, this has again been related to absolute space and does not account for any manipulator dynamic effects in predicting positioning accuracy. More importantly, all of these techniques attempt to define the robot inaccuracy utilizing global methods.

OBJECTS AND SUMMARY OF THE INVENTION

It is an object of the present invention to provide a method for compensating for robot inaccuracy.

It is a further object of the present invention to describe a method which enables off-line programming of robot tasks.

Yet another object of this invention is to provide a method for improving orientation and/or location accuracy of a programmable robot with respect to a target object.

A still further object of this invention is to provide a method for calibrating the position of a terminal control frame attached at a distal link of the robot as part of a robot movement control system.

Yet another object of this invention is to provide a method for mapping features on a target object for improving accuracy of manipulation and processing as part of the robot task.

These and other objects are realized in a method which is characterized by the following orientation steps. First, the robot is positioned with respect to the target object, with a terminal end-effector having a range of movement which includes the target area. A plurality of reference positions are identified and identification data with respect to such positions is developed and stored in the data processing unit. The robot end-effector is then moved near a reference position, which is referred to as the calibration position. Here, a sensor coupled to the robot detects the presence of the calibration position or feature. This position is compared with the originally stored information data relating to the same calibration position. A rigid body error correction based on position differences is developed and stored within the data processing unit. The end-effector is then moved to a second reference position based on originally stored identification data which is modified by applying the rigid body correction to more accurately predict proper placement of the robot with respect to the second reference position. Other related steps involving inaccuracy mapping and calibration of the robot terminal control frame are disclosed.

Other objects and features of the present invention will be apparent to those skilled in the art from the following detailed description taken in combination with the accompanying drawings.

DETAILED DESCRIPTION OF THE INVENTION

Figure 1:
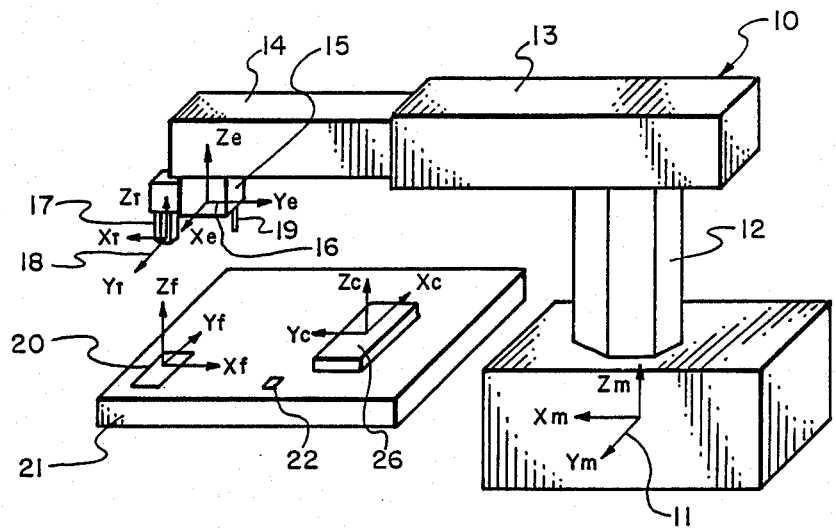
FIG. 1 depicts a graphic representation of a robot performing manipulations with respect to a calibration plate or other target part.

The present inventors have discovered that off-line programming of a robot task can be implemented where a relative frame of reference is utilized as opposed to a global reference frame. Specifically, the inventive methods disclosed herein are based on spatial relationships and orientations which are compared on a relative basis to local features or reference frames, rather than attempting to relate robot movements to a global reference frame. This method assumes that the geometry of the target parts on which the robot is to operate or use is known within some acceptable tolerance. Indeed, a significant aspect of this invention is characterized by the premise that successful off-line programming is enabled with methodologies that are based on relative information, as opposed to global reference frames. Such a premise relies on the fact that most robots are repeatable to within satisfactory tolerances and that target parts on which the robot operates have been previously manufactured to a satisfactory tolerance. In view of this premise, it will be apparent to those skilled in the art that the repeatability of the robot must be less than the desired tolerance of the robot task. It is also essential that the geometry specifications for the part on which the robot will operate can be accessed and passed to the robot work cell as needed.

Generally, the present methods incorporate the use of sensors such as vision systems and touch probes to view or probe known features on the target part(s). The sensor systems and work cell layout are designed so that these features can be accessed by either manual control of the robot or by using off-line planned paths. This choice is made depending on factors such as the capacity of the sensor system and the accuracy of the original geometrical layout of the work cell.

In implementing the disclosed methods, it is generally assumed that the parts are delivered in a repeatable manner to the work cell within acceptable tolerances, and that the geometry of the part remains within such tolerances. Where these conditions are satisfied, the methodology involves use of sensor systems to access known geometric features which are located on the target part. The difference between the actual and sensor measured geometry is the robot inaccuracy measured relative to the part. Once this inaccuracy is known at selected features, the robot can be commanded to move more accurately to other part interaction points using interpolated and extrapolated predictions of the robot inaccuracy. Based on this predicted robot inaccuracy, an error correction algorithm can be applied to deviate the off-line planned path and improve the effective robot accuracy by as much as an order of magnitude or more.

In simple context, the general method involves identification of a first reference feature on a target part or at a target position. This feature is utilized to make a rigid body pose correction relative to the robot. Other reference features or positions will generally be determined relative to the first reference feature, but may be determined relative to each other as well. The feature relative geometry is then utilized to determine the robot inaccuracy that occurs, based on relative rather than global moves This method provides a major advantage over the prior art in that robot inaccuracy need not be determined globally, but is only determined in localized regions. Typically, these regions would be volumes of space in which the robot is actually performing interactions with a target part. Furthermore, inaccuracy measurements need not be made by independent measurement devices which may require global positioning.

With reference to applications to manufacturing, this provides a significant advantage in that parts which are delivered repeatably and within tolerance may be initially mapped or measured for robot inaccuracy relative to the part. After mapping, the sensor system can be turned off and the robot task can be repeatedly performed. Occasional mapping can be implemented to verify that the parts and robot are operating within required tolerances. In this mode, the method can be used for statistical process control.

The off-line programming techniques disclosed herein assume that the work cell and robot tool geometry are known relative to the robot base frame for any robot configuration. Generally, this information is supplied by the manufacturer or can be otherwise determined. Global off-line techniques fail because robots cannot be commanded to move to global positions in space accurately due to joint misalignment, joint compliance, gear train errors, etc. Target parts separate from the robot frame are located by a sensor such as a vision system. Such parts are located relative to a vision camera frame (also referred to as frame of reference) using relative joint transformations. Once these parts are located in the robot base frame, inverse kinematic solutions determine robot joint values which move the robot tools or end-effectors to the desired operation points.

Calibration techniques are applied with respect to the various elements of the robot including the base frame, intermediate links, distal link (including distal link frame) and terminal control frame which is associated with the end-effector. The object of such calibration techniques is to establish exact relative position and orientation measurements along the robot components. Obviously, once such relative position and orientation measurements are known, a determination of any specific position orientation of a robot component enables the determination of specific positions and orientations for all other robot components from the base frame through the terminal control frame.

The present invention discloses two levels of robot calibration, namely off-line calibration and on-line calibration. Off-line calibration techniques are used to precisely locate the terminal control frames (TCF) for end-effectors which are attached to the robot distal link or last link in the robot arm. Robot teach terminal readout is used to determine the end-effector TCF location. On-line calibration is used to position the robot TCF relative to the parts in the work space and thereby compensate for robot inaccuracy in localized regions of the robot's work space. Because these calibration methods utilize localized reference features, the robot inaccuracy is less than the desired tolerances required for assembly. In addition, statistical averaging of the calibration data can be utilized to compensate for some of the robot position errors.

A simulation of manipulator and robot tasks (SMART) has been developed with simulation software for off-line planning of both calibration tasks and working tasks. The calibration path is a set of robot configurations which, when integrated, downloaded to the robot controller, and executed, will cause the robot to move the vision system such as a camera near to the desired calibration feature being identified for part location. The working path is a set of robot configurations, speed settings, pick/place commands, etc. which, when integrated, downloaded to the robot controller, and executed, will cause the robot to move the robot tool to the desired operation points Because of robot inaccuracy and work cell geometry uncertainties, the off-line path planned by a computer simulation must be modified to account for errors. These errors are measured by the vision system or other sensing means. Conformed path deviation algorithms are developed which use appropriate control points within the pre-planned paths to perturb or adjust the predicted working path, and yet maintain similar Cartesian path shape. Such procedures are discussed in greater detail hereafter.

The first of the disclosed calibration methods relates to calibration of the TCF position, which relates to end-effectors and sensors attached to the distal link of the robot. These relationships will be better understood with reference to FIG. 1. This figure discloses a robot 10 having a base reference frame 11, intermediate links 12, 13 and 14. A distal link 15 comprises the last link of the robot arm and includes a distal frame 16. An end-effector such as a camera, gripper or tool 17 is coupled to the distal link 16. A terminal control frame (TCF) 18 is associated with the end-effector and provides its frame of reference. These frames are graphically identified as the manipulator global frame $(XYZ)_m$, the end-effector or vision TCF frame $(XYZ)_T$ and the robot terminal frame or distal frame $(XYZ)_e$.

The object of calibrating the TCF position is to define this frame 18 with respect to the distal frame 16. Because the relative position of the distal frame with respect to the manipulator frame 11 is known, this calibration technique will tie all three reference frames together. The computer data processing and storage unit of the robot can readily calculate relative positions of any of these elements, given the position of any one element.

The method is practiced by attaching a pointing means such as an elongate pointer 19 to the robot distal link 15 such that the pointing means 19 is aligned parallel with the Z axis of the distal frame 16. A first reference point is selected at a space removed from the robot but within the operational distance. This reference point in FIG. 1 is represented as item 20 and may comprise an etched mark on a calibration plate 21. The robot is then moved to a first pose wherein the pointing end of the pointing means is located at the first reference point. The robot positioning data representing this first pose is stored in the robot computer for later recall and comparison. An end-effector such as a camera 17 is coupled to the distal link and includes a reference point (not shown).

The robot is then moved to a second pose wherein the end-effector reference point is located at the first reference point. Although item 20 is shown as a large rectangle, the reference point would be a single point which could be made coincident with the pointer 19. The robot positioning data for the second robot pose of this last step is also stored in the computer means for later recall and comparison.

Figures 2A, 2B, 2C:
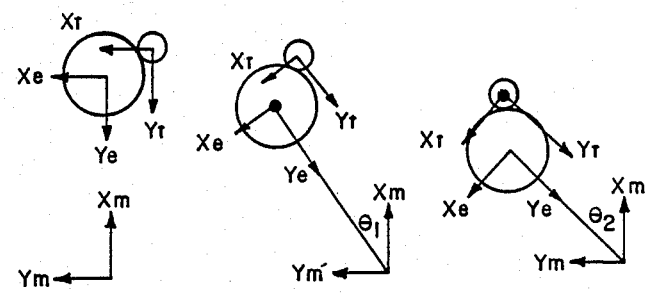
FIGS. 2a, 2b and 2c represent position calibration steps for the terminal control frame.

The next step in the calibration for TCF position involves comparing the stored positioning data representing the first and second pose for detection of differences. These differences are processed within the robot computer to define an offset position of the TCF with respect to the robot distal frame. This step is accomplished using the following equations which can be derived by merging the configurations of FIGS. 2(b) and 2(c). From this sequence of steps it is possible to generate a set of equations which can be solved for X and Y, the TCF origin position coordinates in the robot distal link frame as follows:

$$X = (X_2 - X_1) S_2 - (Y_2 - Y_1) C_2 \quad \text{Equation (1)}$$

$$Y = (X_2 - X_1) C_2 + (Y_2 - Y_1) S_2 \quad \text{Equation (2)}$$

Where $S_i = \sin \theta_i$; $C_i = \cos \theta_i$; and $X_1$, $Y_1$, $X_2$, $Y_2$, $\theta_1$ and $\theta_2$ are the robot teach terminal readout values.

Due to the robot inaccuracy from sources such as visual inspection, robot encoder and decoder errors, gear backlash, controller error, etc., the same calibration procedure is conducted for a number of randomly selected work space locations 22 (others not shown). The statistical average is then used to determine the best TCF transformation matrix. Such procedures are incorporated within the following method steps. An additional reference point 22 is selected and the robot is moved to a first pose position wherein the pointing end 19 is located at the additional reference point. The robot positioning data representing the first robot pose in this additional procedure is stored in the computer for later recall and comparison. The robot is then moved to a second pose wherein the end-effector reference point is located at the additional reference point 22. The positioning data is again stored and the comparison of data is made, with an appropriate processing of signals to define an offset position of the terminal control frame. The referenced statistical average is derived by repeating the above procedure to develop a substantial statistical base of difference values which can be processed to find the best TCF transformation matrix.

Once the TCF position is defined, calibration of the TCF orientation is necessary. This information is required when assembly or robot use requires both position and orientation determination. This orientation is determined by selecting a second reference point in a space removed from the robot but within the operating distance of the end-effector. The robot is then moved to a first pose wherein the pointing end of the pointing means 19 is located at this second reference point 22. The positioning data representing the first robot pose at this second reference point is stored in the computer memory. The robot computer then processes the stored positioning data for the first and second reference points to identify an orientation vector for a line connecting the first and second reference points. This line and vector have a defined orientation with respect to the TCF. This orientation data is stored in the computer means for later recall and processing.

The robot is then moved to a third pose such that the orientation of the vector relative to the TCF can be defined. This third pose information is also stored and the computer processes the cumulated data to define the relative orientation of the TCF with respect to the terminal distal frame. These steps are more specifically described with respect to FIG. 3 as follows:

Using the TCF position coordinates found in the previous calibration method, two arbitrary points are selected at spots p and q. This is accomplished by moving the robot to a position such that the center of the end-effector TCF is at the arbitrarily selected spot p. This current robot position is then read from the robot teach terminal. The position of q in robot global coordinates can be similarly identified. The orientation vector pq=p−q in the robot global frame is represented by $\alpha$, using the information obtained in step 1 above. This angle is represented by the following expression wherein $x_p$, $y_p$, $x_q$, $y_q$ are the position coordinates of p and q in the robot global frame:

$$\alpha = \arctan(Y_q - Y_p, X_q - X_p) \qquad \text{Equation (3)}$$

Figure 3:
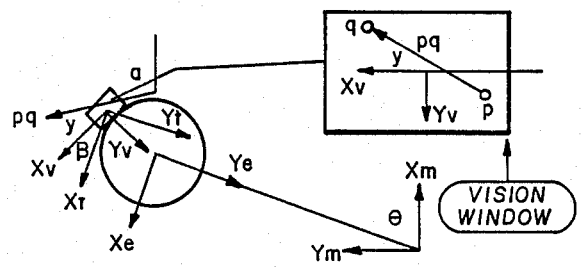
FIG. 3 graphically illustrates determination of TCF orientation within the calibration procedure disclosed herein.

The robot arm is then moved to a position such that the orientation of vector pq relative to the end-effector (angle gamma as shown in FIG. 3) can be obtained. Again, the current robot position is read from the robot teach terminal. For a vision camera and effector, angle gamma can be determined from Equation (4) as follows:

$$\gamma = \arctan(Y_{qv} - Y_{pv}, X_{qv} - X_{pv}) \qquad \text{Equation (4)}$$

where $X_{pv}$, $Y_{pv}$ = position of p in vision screen coordinates, and $X_{qv}$, $Y_{qv}$ = position of q in vision screen coordinates. From this sequence a set of equations can be generated, and TCF orientation, $\beta$ can be determined by:

$$\beta = \arctan[\cos(\alpha - \theta - \gamma), \sin(\alpha - \theta - \gamma)] \qquad \text{Equation (5)}$$

For other end-effectors that are not axisymmetric the end-effector's TCF space X-axis is aligned with vector pq such that $\gamma$ = zero. The TCF orientation calibration procedures set forth above can be used for any end-effector attached to the robot distal link. Statistical averaging for the best TCF orientation can be conducted using the procedures previously outlined.

On-line robot calibration is conducted at run time. By using a vision camera, the calibrated TCF geometry information and the work piece geometry information from a pre-processed data base, on-line calibration will determine the relative locations of work pieces in the work space. This permits correction of rigid body and robot position errors which are detailed in other parts of this disclosure.

The relative approaches developed use the calibration features shown in FIG. 1 and a vision system to capture the relative geometry information between parts and the robot end-effectors. Using the relative frames shown in FIG. 1, the component pose with respect to the robot global frame can be represented by the transformation equation as follows:

$$T_m{}^c = {}^c T_m{}^e T_e{}^v T_v{}^f T_f{}^c \qquad \text{Equation (6)}$$

where:
- $T_m{}^c$ = transformation from the component frame to the robot global frame.
- ${}^c T_m{}^e$ = transformation from the robot terminal frame to the robot global frame when the vision camera acquires the calibration feature.
- $T_e{}^v$ = transformation from the vision camera frame to the robot terminal frame, as determined by the off-line robot calibration.
- $T_v{}^f$ = transformation from the calibration feature frame to the vision camera frame, as determined by the image analysis [6].
- $T_f{}^c$ = transformation from the component frame to the calibration feature frame, and determined from pre-processed workpiece geometry data bases.

With the TCF position and orientation now defined with respect to the distal frame, it is possible to establish relative position and/or orientation of any target object or part with respect to the computer. This is accomplished by defining reference frames on a relative basis, as opposed to endeavoring to define robot position with respect to a global reference frame. From a practical sense, the use of relative reference frames between the part and the robot position are preferable, because most manufacturing operations are specified relative to a local frame of reference or part datum. Utilization of the present method enables robot poses to be referenced and robot inaccuracy to be characterized relative to the part datum, rather than a more complex global reference frame.

This invention includes a description of methodology which can be applied to a kinematic model and stochastic model, as well as other analytical forms. The general procedure is represented by the following steps:

The robot is positioned with respect to a target object or position and a plurality of separated reference positions or features are identified. Typically, these features will be located on the target object and will be characterized by specific geometries and spatial data. The next step is to identify data defining these geometries, as well as spatial data of the separated reference positions relative to the target. This identification data is stored for each respective reference position within a data processing unit such as the computer system of the robot. This information will be utilized in a comparison operation by the robot upon later excursion to a location near this reference position.

Figure 4:
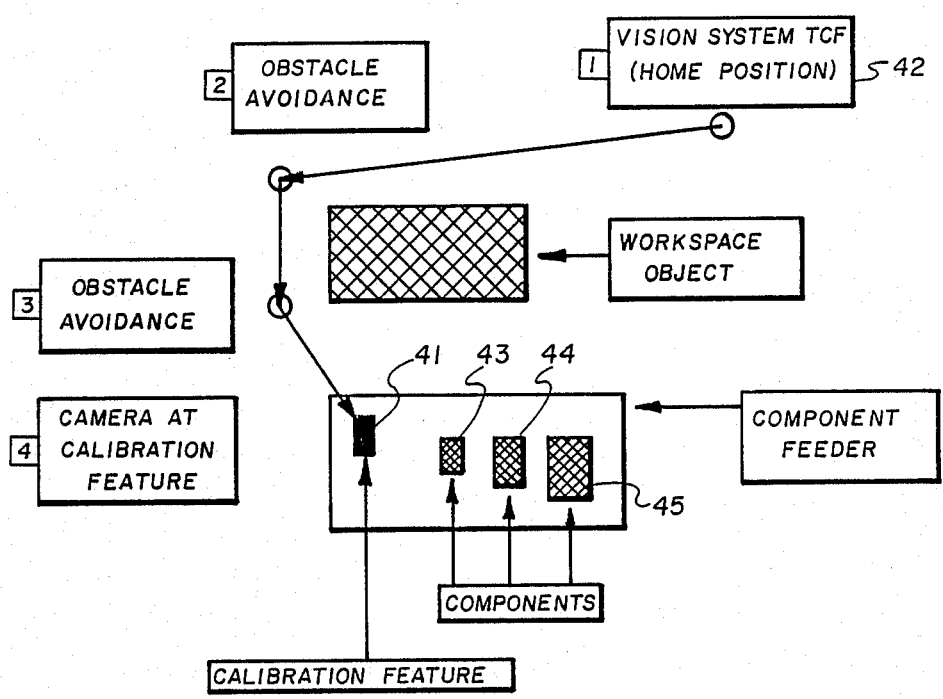
FIG. 4 graphically illustrates a calibration path segment in Cartesian space.

The robot end-effector is then moved to a first location near one of the reference positions. For example, in FIG. 4, the robot end-effector is moved to an initial reference position 41 which is defined as the calibration position or calibration feature. In this position, the end-effector detects the presence of the calibration feature This detected calibration position is compared with the originally stored information data relating to that position. A rigid body error correction is developed based on position differences detected in the previous comparison step. This correction will be used with respect to later moves of the robot relative to this calibration position. The rigid body error correction data is then stored within the robot computer for later use.

The end-effector 42 is then moved to a second reference position 43. This movement is developed based on identification data regarding this reference position 43 as it was loaded into the robot computer with the originally stored identification data regarding this reference position In addition, however, the movement of the end-effector to the second position includes a correction factor developed by application of the rigid body correction defined from the previous step. This more accurately predicts proper placement of the robot in approximate vicinity to the second reference position 43. Accordingly, the present invention defines a rigid body correction with respect to a first calibration feature 41 and applies this correction with respect to subsequent moves, thereby modifying the originally stored identification data for the second position.

This method can be further extended to apply statistical averaging by measuring additional reference positions, comparing the detected new reference position with respect to the predicted value of this position. The difference between the predicted position and the actual position of the robot is detected and processed to define the amount of correction necessary to position the end-effector at subsequent reference positions with greater accuracy. This defined correction is stored within the computer for later processing. This is accomplished by repeating the movement, detection, storing and processing steps with respect to each additional reference such as items 44 and 45 of FIG. 4.

Figure 5:
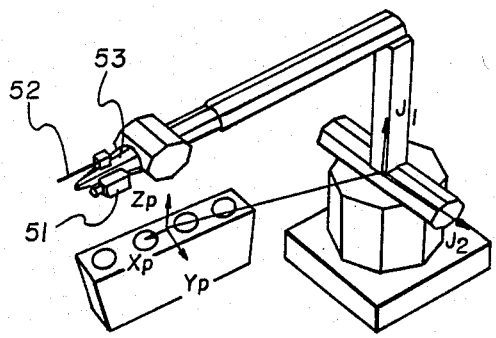
FIG. 5 depicts a robot with terminal control and sensor components.

This procedure ha been applied with respect to a vision camera 51 and touch probe 52 mounted adjacent to the robot end-effector 53 as shown in FIG. 5. In conjunction with the vision 51 and touch sensors 52, a calibration plate or table 61 containing reference features 62 serve as a template to measure robot position. For example, feature 63 may be identified as the calibration feature, which is the first feature to which the pointer 52 is positioned. The remaining feature such as 62 offer additional reference points which can assist in building a statistical average to improve determination of the kinematic model. In this instance, the position of the reference feature is referenced to the calibration table datum (which is predetermined in construction) and robot poses are measured with respect to the calibration table datum.

Figure 6:
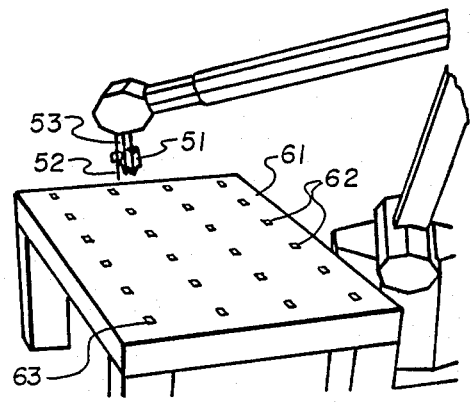
FIG. 6 illustrates a robot configuration with respect to a calibration table.

The application of this methodology to measurement of the kinematic model of the robot is a slight modification of procedures described by Mooring, B. W., "The Effect of Joint Axis Misalignment on Robot Positioning Accuracy", Proceedings of the ASME Conference on Computers in Engineering, Chicago, Illinois, 1983 [1], and Tang, G., "Calibration and Accuracy Analysis of a Six-Axis Industrial Robot", Doctoral Dissertation, Dept. of Mechanical Engineering, Texas A & M University, December, 1986 [2]. Using these procedures, the kinematic model of a robot manipulator can be calculated from measured pose data. The calculated kinematic model is formulated by determining the location and orientation of each joint axis comprising the robot. This kinematic formulation is based on the generalized screw displacement matrix, formulation described by Suh, C. and Radcliffe, C. W., Kinematics and Mechanism Design, New York: John Wiley & Sons, 1978 [3], where a location vector p and an orientation vector u defines each joint. Once the actual joint model parameters are determined, a calibrated kinematic model is developed. This model is defined with respect to the part datum referenced during pose measurements as shown in FIG. 6.

When the robot kinematic model is accurately known and each robot joint value is specified, the robot pose can be accurately predicted. Inverse kinematic models can be developed which calculate joint values necessary to accurately position the robot at specified poses. Inverse kinematic formulations can be based on Denavit-Hartenburg parameters or any valid formulation of robot kinematics. Most robot controllers utilize such an inverse-kinematic transformation and many robot models are published in the literature. The subject inventors have developed algorithms which are based on predictor-corrector and inverse Jacobian formulations.

The simple predictor-corrector method utilizes the calibrated kinematic model of the robot to predict robot position. Robot pose joint value are estimated using a nominal inverse-kinematics model. The resulting poses and predicted using the calibrated model. The difference between the target pose and the predicted pose is pose inaccuracy. The target position is then corrected to account for pose inaccuracy. The process is repeated until the predicted robot inaccuracy is sufficiently reduced. The inverse-Jacobian method incorporates the inverse-Jacobian into a predictor-corrector iteration scheme by again using the calibrated kinematic model to predict robot position and the inverse-kinematic transformation. The mathematical formulation is similar to the calibrated kinematic model formulation. The partial derivatives of the robot position with respect to each joint value are determined and differential joint correction is estimated by solving the following linear matrix equation for delta q:

$$(\partial T/\partial q_i) \Delta q = \Delta T \qquad \text{Equation (7)}$$

where $\partial T/\partial q_i$ denotes the partial derivative of the robot pose with respect to the ith joint value $q_i$, $\Delta q$ denotes the differential joint value and $\Delta T$ is the difference between the robot position predicted by the calibrated joint model parameters and the target robot pose. Thus, the kinematically corrected joint values are obtained by successive iteration of equation (7).

Figure 7:
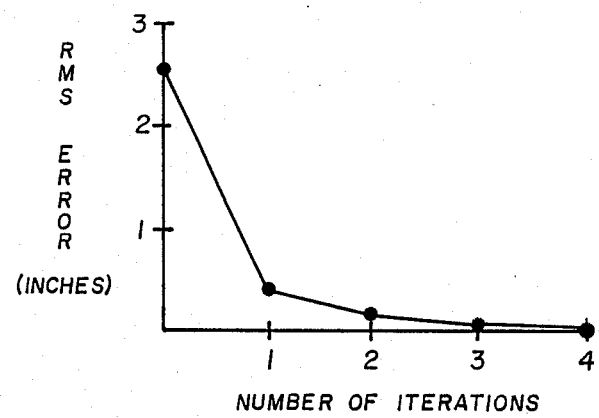
FIG. 7 is a graph representing position error convergence.

A slightly different inverse-Jacobian formulation was also developed for kinematic compensation. This formulation is contained in Paul, R., Robot Manipulators: Mathematics, Programming, and Control, Boston, Mass., M.I.T. Press, 1982 [5]. Both inverse-Jacobian formulations were based on the approximation:

$$(\partial T/\partial q_i)_c \approx (\partial T/\partial q_i)_n \qquad \text{Equation (8)}$$

where $(\partial T/\partial q_i)_c$ denotes the change in robot position with respect to joint value $q_i$ from the calibrated robot model, and $(\partial T/\partial q_i)_n$ denotes the change in robot position with respect to joint value $q_i$ from the ideal or nominal robot model. Convergence of the predictor-corrector and inverse-Jacobian methods for typical robot configuration is shown in FIG. 7. The rms positioning error shown on the vertical axis of FIG. 7 represents the root-mean-square location error of the simulated robot with successive iterations.

Stochastic modeling provides additional inaccuracy compensation capability to further reduce robot inaccuracy. The method of stochastic modeling used in this research is based on the Response Surface Methodolofy (RSM). RSM is used to plan the robot poses necessary to develop a comprehensive statistical model of robot inaccuracy. The design space applicable to a 6 degree-of-freedom robot manipulator is a 2 or 3 level, 6 factor space. The number of levels in the design space determines the order of the statistical model (2 level for a linear model and 3 level for a quadratic model). The number of factors reflects the number of robot joints. The factors represent the independent variables of the linear or quadratic model of robot inaccuracy.

Developing the statistical compensation models requires another set of target part relative measurements as previously described. Before the statistical calibration poses are sent to the robot controller or computer, they are corrected using kinematic compensation as previously discussed. The robot then moves to the corrected poses and the residual inaccuracy is measured. This residual inaccuracy is transformed to differential joint values by again applying the kinematic compensation algorithms (predictor-corrector or inverse-Jacobian). The residual differential joint perturbations are determined from the statistical compensation equations as follows:

$$q_i = a + b_{i1}q_1 + c_{i1}q_1^2 + b_{i2}q_2 + c_{i2}q_2^2 + \ldots + b_{i6}q_6 + c_{i6}q_6^2 \quad \text{Equation (9)}$$

where a, b, and c represent quadratic model coefficients obtained from regression analysis, q represents the joint values, and $q_i$ denotes a differential joint perturbation. The first subscript of the model coefficients designates the joint compensated ($i^{th}$), an the second coefficient subscript designates the joint. Likewise, the joint value subscript designates the joint.

A typical compensation process utilizing this methodology is as follows. The calibration poses are planned off-line on a simulator. The robot moves and positions itself in the calibration poses required by the calibrated kinematic model, and the inaccuracy is then measured. The robot moves and positions itself in the calibration poses required by the statistical model (as determined by RSM), and the inaccuracy is measured. The desired task is then planned off-line relative to the part datum. The off-line planned task is corrected using the models developed with respect to the calibration poses for the kinematic model and the statistical model. The compensated task information is then sent to the robot controller. Once the initial steps of planning calibration poses off-line and measuring the calibrated kinematic model poses need only be repeated infrequently. Measurement of the statistical model calibration poses are repeated periodically and the remaining procedures are repeated for each robot position planned on an off-line simulator.

As has been previously indicated, off-line programming in accordance with the present methodology is based on relative information, relying on the fact that most robots are repeatable with acceptable tolerances, and on the additional fact that parts on which the robot operates have been previously manufactured to some satisfactory tolerance. By guaranteeing that the part to be worked on will reach the robot work cell with some predetermined tolerance, it is possible to use off-line programming to command the robot to move to a reference calibration feature on the part, thereby capturing the rigid body inaccuracy information. With the establishment of a reference feature (item 41 in FIG. 4 and item 63 in FIG. 6) the robot can now be commanded to move to other predetermined features on that part. Knowing the relative geometry between the part features, procedures may be implemented to define the inaccuracy of the robot relative to the part on which it operates. Correction routines are then implemented which correct for the inaccuracy of the robot in the localized regions, thus allowing the practical application of off-line programming methods.

This enables the mapping of localized inaccuracy of the robot. Such mapping would not be necessary for each part which enters the work space if the part is positioned repeatedly within a predetermined tolerance. When parts enter the work space with the stated repeatability, the sensor equipment may be turned off during assembly operations, thus speeding the assembly process by compensating for robot inaccuracy utilizing software modification in the off-line programs.

A general method for mapping robot inaccuracy with respect to a target object is set forth as follows. First, the target object is identified, including a plurality of identifiable features thereon which can serve as reference points. A feature data base is developed defining the geometries and spatial relationships of the features on the object in sufficient detail to enable individual recognition of each feature by the computer sensing means. Feature data base information is then stored within the robot computer for later recall and comparison. The target object is placed within operational reach of a distal link of the robot and sensing means are attached to the distal link which include a capability of detecting the stored features of the target object. This detection is usually based on a comparison of (i) sensory data developed by the sensing means with respect to the feature and (ii) the stored feature data base information.

As with previous methods of kinematic and stochastic modeling, the sensing means is calibrated with respect to the distal link to accurately define relative positioning of the distal frame with respect to a terminal control frame of the sensing means. This calibrated terminal control frame position is stored within the computer for later recall and comparison. A routine or program is prepared which correlates stored feature data base information with the calibrated terminal control frame position. This routine provides drive commands to the robot for moving the sensing means sequentially to predicted positions of the respective features to be mapped on the target object.

The next step is to activate the routine with the robot, thereby moving the sensing means to a calibrated feature which is one of the stored reference features on the target object. For example, this could be item 41 in FIG. 4 or item 63 in FIG. 6. The relative pose error of the actual position of the sensing means with respect to the predicted position i defined and provides rigid body correction data. This data is stored within the computer for later recall and comparison. For example, the stored rigid body correction data is correlated with the prepared routine or program to define a new predicted position for an additional or subsequent feature to which the sensing means will be moved (items 43, 44, and 62). The sensing means is then moved to the new predicted location and the relative pose error of the actual position with respect to the new predicted position is defined. This error data is stored within the computer. By repeating these steps with respect to each remaining feature, a map of the target object is developed providing a statistical base for robot inaccuracy.

Figure 8:
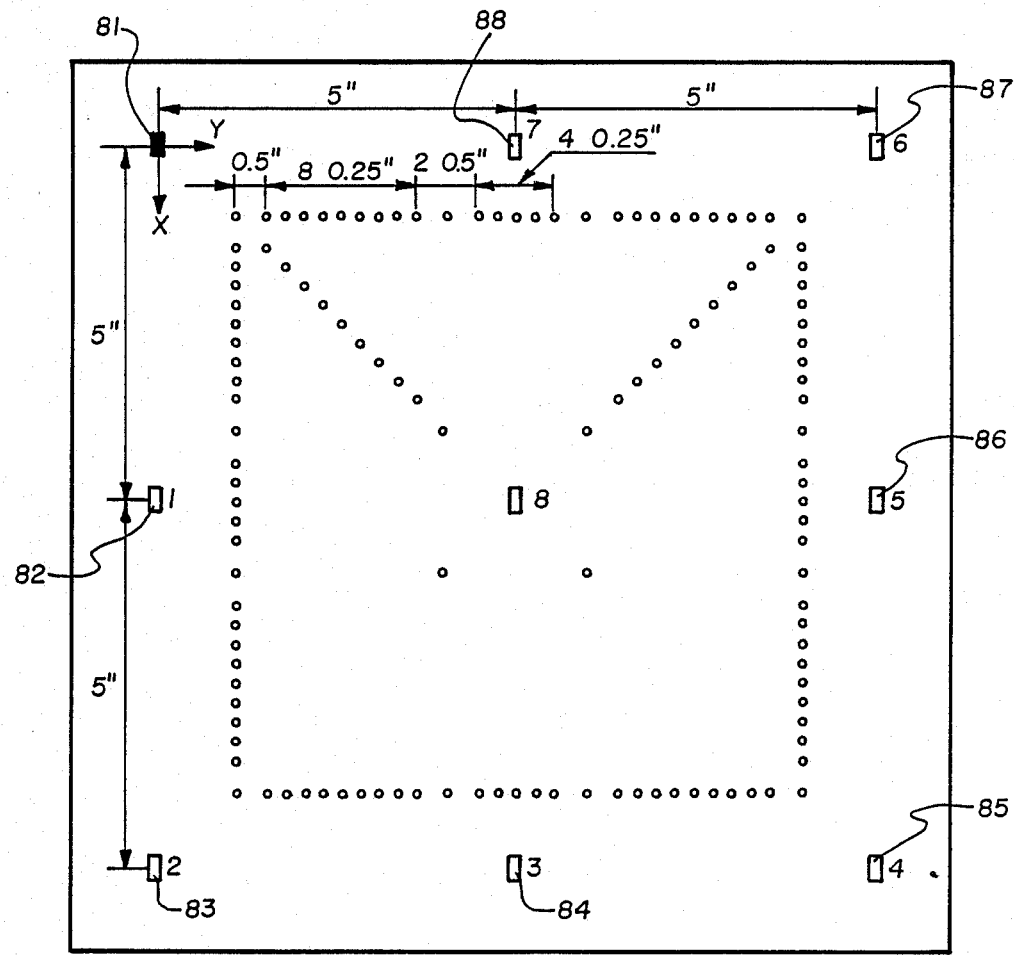
FIG. 8 discloses an exemplary calibration table for use with the present invention.

This general procedure was applied with respect to a calibrated plate machined to a tolerance of +0.0005 inches. The dimensions of the calibration plate are shown in FIG. 8 in graphic form.

Once the TCF is determined, inverse kinematic routines can be implemented to correctly position the camera frame near the part feature. An Automatix AV-3 vision system was calibrated with respect to the plate illustrated in FIG. 8. The relative pixel size of the y-pixel to the x-pixel was determined by location two dots on the calibration plate within the vision system camera frame. Their respective locations in pixel coordinates were then determined by statistically averaging over a number of tests to obtain the ratio of the y-pixel distance to the x-pixel distance. The distance between pixels in real world coordinates was also required. By using the same two dots and by knowing the physical distance separating the dots, a statistical average was obtained from the tests.

The origin of the coordinate frame of vision system was located at an x-pixel of 192.0 and a y-pixel of 127.5. Because the vision system was used, a coordinate frame was determined which related the feature captured by the vision system to the TCF frame of the camera which was attached to the robot distal link. The method used to determine this frame was the calibration method disclosed in the initial part of this specification for the TCF. This transformation involved getting the calibration plate coordinate frame and the vision system coordinate frame in the coordinate frame of the camera TCF, equation (10).

$$T_v^f = T_v^c * T_c^f \qquad \text{Equation (10)}$$

where:
$T_v^f$ = transformation from the calibration feature frame to the vision system frame;
$T_v^c$ = transformation from the camera TCF frame to the vision system coordinate frame;
$T_c^f$ = transformation from the calibration feature frame to the camera TCF frame.

The utilization of a "relative" positioning method represents a significant improvement over prior art techniques because an understanding of robot inaccuracy is only needed in the localized part area on which the robot operates. When the robot is making sweeping moves between work stations, the inaccuracy of the robot is not critical. However, because great accuracy is required in actual assembly or other for of robot task such as a pick or place move, the inaccuracy of the robot needs to be defined within this small area. These procedures were successfully demonstrated on a SEIKO RT-3000 series robot which is repeatable to +0.001 inches.

Figures 9, 10, 11:
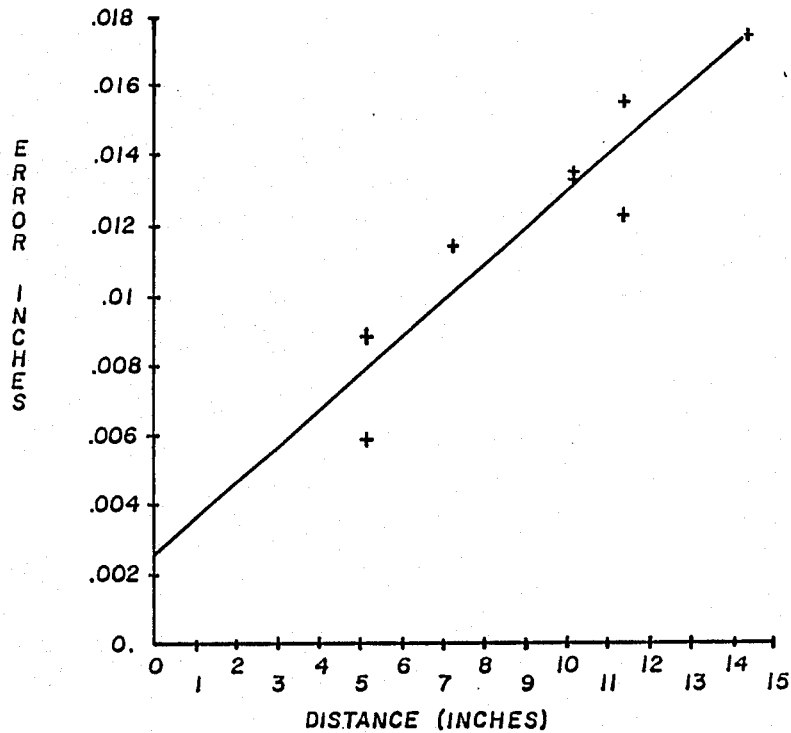
FIG. 9 is a data summary based on performed experiments regarding robot inaccuracy.
FIG. 10 is a graphic plot of robot inaccuracy measurements.
FIG. 11 discloses data with respect to error correction or orientation.

By using the calibration plate of FIG. 8, the robot inaccuracy propagation over a localized area was determined by first moving the camera over the reference calibration feature 81. From this feature the necessary information was captured which allowed for a part rigid body error correction for all subsequent moves of the robot. The rigid body error correction applies the same translation and orientation correction to all the features used in inaccuracy mapping of the robot relative to the part. Once the rigid body error transformation was determined, the robot was commanded in the vision system software to move to the next feature 82. By accessing a data base, all eight features 81–88 were mapped by the vision system. FIG. 9 lists the test data obtained in determining the robot inaccuracy. As seen in FIG. 10, the robot error increases proportionally (near linear) with distance from the reference calibration feature 81.

Since the localized position inaccuracy is a near linear function of distance, the following linear equations were developed to compensate for robot inaccuracy:

$$Ex = A_1 x + B_1 y \qquad \text{Equation (11)}$$

$$Ey = A_2 x + B_2 y \qquad \text{Equation (12)}$$

To solve for the constants it is necessary to capture the inaccuracy information from two independent points in the workspace area. This was accomplished by first moving the camera to a reference calibration feature to determine the rigid body error correction and then the camera was moved to two other features, designated i and j, from which all the necessary information was obtained to solve equations (11) and (12). The error equations at object i are:

$$Ex_i = A_1 x_i + B_1 y_i \qquad \text{Equation (13)}$$

$$Ey_i = A_2 x_i + B_2 y_i \qquad \text{Equation (14)}$$

where $x_i$ and $y_i$ are the Cartesian moves of the robot and $Ex_i$ and $Ey_i$ are the position errors captured by the vision system at object i. Similarly, the same information was captured at object j. Next Kramess rule was applied to solve for the constants $A_1$, $B_1$, $A_2$ and $B_2$. In this experiment, features 2 and 6 represented objects i and j respectively.

Next, the database information was modified to correct for predicted positional errors in location of each feature as the robot was commanded to move to all the features. FIG. 11 lists the error after the robot has been corrected for inaccuracy. Comparing FIGS. 9 an 11, it can be seen that the maximum robot inaccuracy of 0.0172" was improved to 0.0025" at a distance of 14.142" away from the reference feature. This is near the camera resolution and not realistically attainable. A statistical analysis of tolerance stack-up would imply that these techniques could be applied to processes not requiring greater than 0.005" of positional accuracy.

Robot orientation compensation presents greater difficulty. The orientation inaccuracy of the robot is not a function of distance from the reference calibration feature. Such orientation inaccuracy can be attributed to sources such as gear backlash, joint compliance, vision system algorithm limitations, etc. Experimentation has demonstrated that the orientation inaccuracy after a linear equation for orientation correction similar to the premise that successful off-line programming is enabled with methodologies that are based on relative information, as opposed to global reference frames. Such a premise relies on the fact that most robots are repeatable to within satisfactory tolerances and that target parts on which the robots operates have been previously manufactured to a satisfactory tolerance. In view of this premise, it will be apparent to those skilled in the art that the repeatability of the robot must be less than the desired tolerance of the robot task. It is also essential that the geometry specifications for the part on which the robot will operate can be accessed and passed to the robot work cell as needed.

Figure 12:
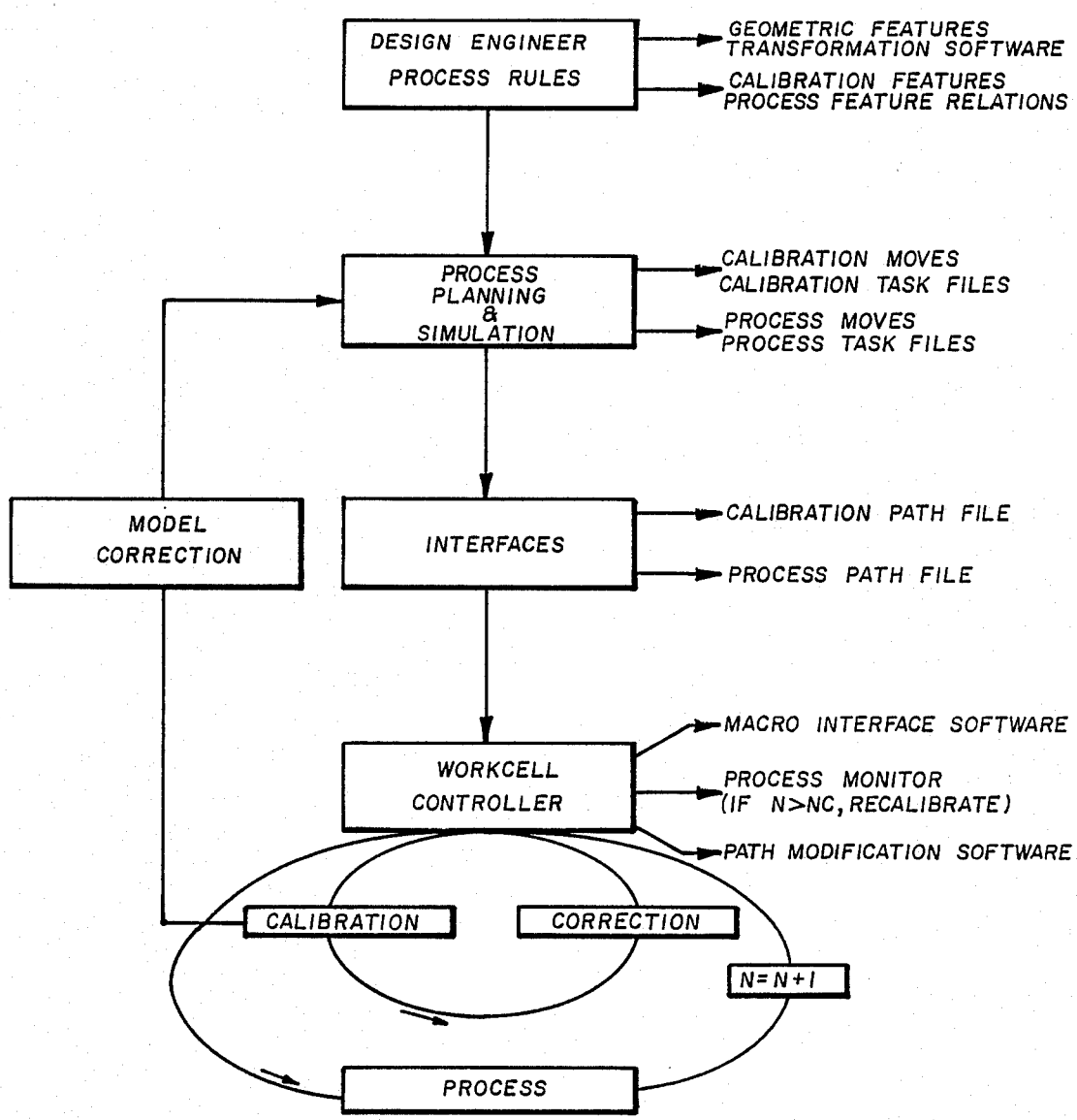
FIG. 12 is a graphic flow chart summarizing the integrated steps of the present invention.
Figure 13:
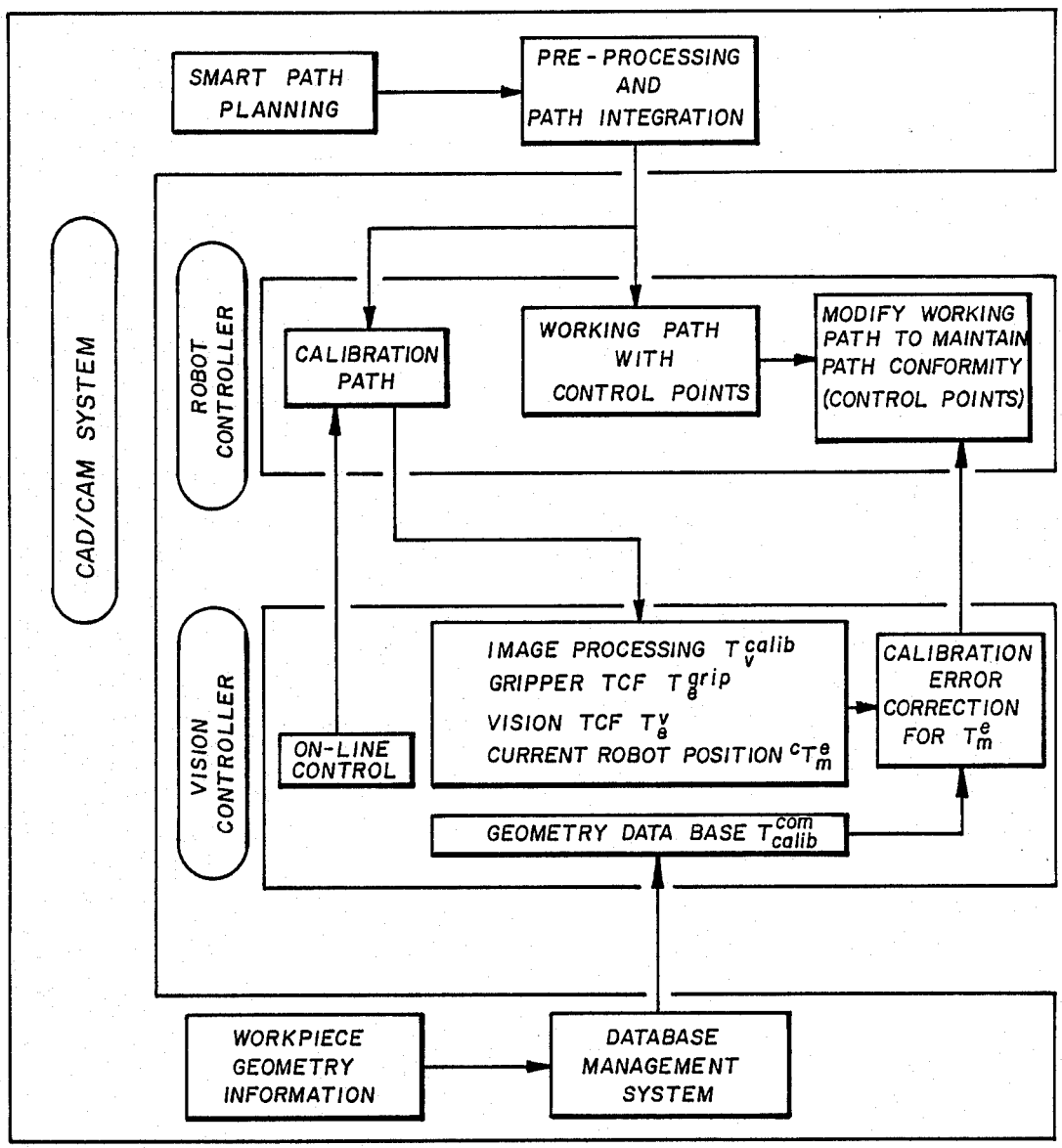
FIG. 13 is a graphic flow chart illustrating the calibration procedures integrated with the present invention.

Referring to FIG. 12, a flow chart illustrates the information flow and data base structure representing implementation of the subject invention within a typical manufacturing process. This flow chart integrates the calibration steps regarding TCF with the other forms of error correction based on relative rather than global reference frames. FIGS. 12 and 13 illustrate the integration of the present methodology from the calibration state through error determination and mapping stages. Referring specifically to FIG. 12, geometric features of targeted parts are usually well specified by design engineering and can be accessed at the robot task-planning stage of software preparation. Transformation software can be utilized to make the appropriate conversions to load geometric descriptions of features into the robot controller. Off-line calibration rules as set forth in the initial part of this disclosure can be integrated into the part design so that sufficient reference features can be identified or placed on the part for use by the robot feature acquisition system. For example, a vision or camera system has been described as useful for mapping the target part during the dynamic calibration stage. It is apparent from the preceding disclosure that the parts on which the robotic system operates must have the calibration reference features processed on them before they enter the robot work cell. These features may be resident geometry which can be easily processed by the feature acquisition subsystems or simply add-on features, either permanently placed on the part or placed on a temporarily attached template 26. Note that if the part is delivered in a consistent fashion, the accessing of features only needs to be conducted periodically. The integration of these procedures is represented by the initial box 110 of FIG. 11.

The planning process can be developed off-line in both the calibration tasks and the actual process tasks. These tasks are filed as a set of robot configurations with sufficient information to specify pick or place, speed settings, sensor read, etc. This planning involves both the calibration moves to be stored in calibration task files and the process moves to be stored in process task files. This aspect of the process is represented by box 111.

The path/task files can be downloaded to the work cell controller of the robot by file transfer software, using as a minimum serial RS232 communications. These interfaces are represented as item 112 in FIG. 12. Item 113 represents the work cell controller which maintains the software to convert the path file configurations into robot task macros. This software has both general algorithms applicable to most robots and device driver-type algorithms which are robot specific. At calibration, software is activated to correct the robot inaccuracy as observed by the sensor system, such as the camera. In its simplest form, this software consists of interpolation algorithms which operate on a matrix of position and orientation errors observed during the calibration phase. More complex software develops distortion transformations which map object geometries as distorted by the robot inaccuracies. Using these transformations, the robot operates on perceived part geometries.

Using the corrected transformations, software is activated to modify the pre-processed paths. This requires that the robot configurations be modified in the vicinities of the interaction situations using control points. These control points maintain the path shapes near critical assembly interaction points and correct for surface feature distortions due to the robot positioning inaccuracy. The simulation user will have insured that the intermediate configurations are sufficiently removed from work space obstacles as to avoid collision even after a path has been locally modified. Accordingly, these procedures not only relate to box 113 of FIG. 12, but also to box 111.

Figure 14:
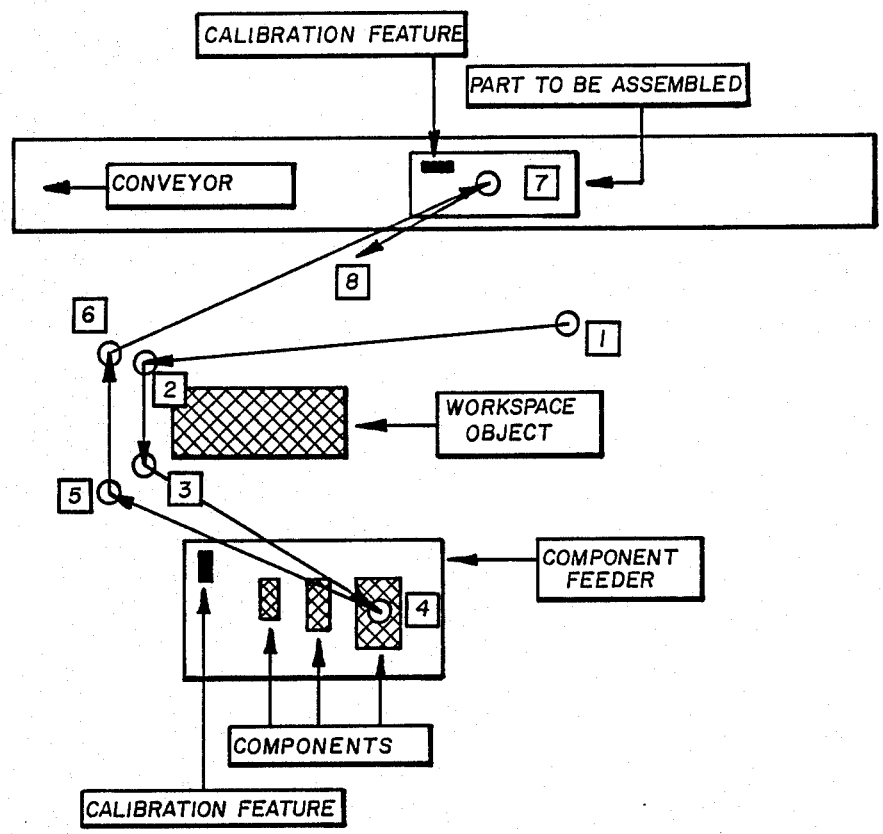
FIG. 14 graphically illustrates the use of control points in preprogramming methods.

The use of control points is illustrated in FIG. 7. During the calibration off-line path planning, the user enters a set of generalized set of generalized displacement matrices in global coordinates to describe a set of desired calibration poses for the vision system TCF. FIG. 7 illustrates the calibration path segments 1, 2, 3 and 4 as they are connected to form a path in Cartesian space. During working path simulation planning, the gripper TCF is used as the robot end-effector TCF and the user enters displacement matrices to describe a set of desired poses of the gripper TCF relative to the components on which the gripper acts. FIG. 14 illustrates the concatenated working path segments in Cartesian space and the critical path nodes. After planning the calibration and working paths, the planned path segments are filed for later use in path segment integration and path deviation. The path file contains the number and sequence of path configurations, pick/place activation flags and other information relating to robot speed settings. At this stage, path files exist; however, they may not represent the exact form of the final path. To determine the exact form, integration procedures are applied which integrate the preplanned tasks and converts them to control languages used in work cell controllers such as those in the vision system or robot. Integration software has been developed that will allow the user to combine the preplanned path segment files by adding or deleting path segments from the total task file or by changing the sequence of path segments. Additionally, the user can enter commands in the robot control language during the integration process.

The off-line path planned by computer simulation must be modified to account for calibration errors measured by the vision system or other sensors and to account for geometric modeling uncertainties. There are various ways that off-line paths can be modified; however, for purposes of illustration, the Cartesian path shape or path conformity of critical path segments will be maintained by deviating the path while maintaining consistent relative Cartesian motions of the robot end-effector terminal control frame.

It is impractical to deviate the entire assembly task path to maintain the path conformity. Path segments near critical points such as pick and place locations are candidates for conformed path segment deviation by specifying three control points. The first point is the control pose point (CPP) which is a critical point where calibration error affects the effectiveness of the robot end-effector interaction with the part. The second point is the control point next (CPN) which is a point after which there will be a critical point (CPP). The Cartesian shape of the deviated path segment between CPP and CPN must conform to the shape of the Cartesian path planned by simulation. Finally, control point last (CPL) is a point before which there has been a critical point (CPP). Path conformity after path deviation must be maintained between CPP and CPL.

Figure 15:
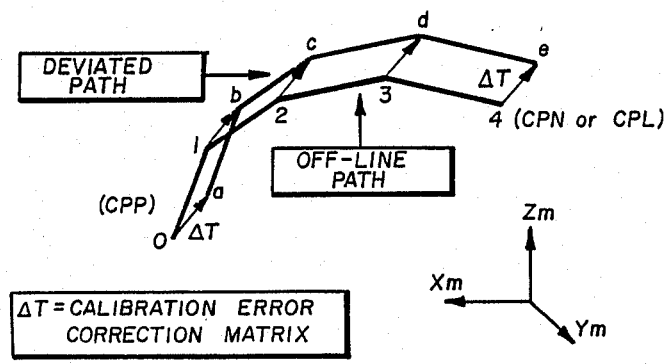
FIG. 15 graphically illustrates the use of deviated path for avoiding unintended contact between the robot arm and obstacles.

In a Cartesian work space, the task of modifying a path segment to maintain path conformity can be described as deviating each off-line planned pose of an end-effector TCF between the control points exactly the same amount of translational and rotational error detected during calibration. In other words, the displacement matrix of the end-effector TCF for every node on the simulated path segment is post multiplied by the same error correction transform matrix to get a new displacement matrix from which the conformed deviated path segment results. This is illustrated in FIG. 15 wherein poses 1, 2, 3 and 4 have been deviated by the software to points b, c, d, and e. This deviation method represents a novel approach to avoiding collision between the end-effector and obstacles within the work cell which might fall within the path of a modified planned pose.

The practical off-line programming techniques developed and illustrated in this disclosure have been applied to microelectronics assembly tasks in accordance with the following steps. Microelectronic chips of different sizes were picked up by the robot end-effector from a component feeder. Deviation path planning was developed to avoid work space collisions during transitional paths. The microelectronic chips were inserted into a designated IC board location. These tasks have been successfully accomplished and the off-line programming techniques developed have been shown to improve the robot position accuracy to +0.1 mm. within small areas of work space using rigid body error correction.

It will be apparent to those skilled in the art that the foregoing description and specific reference to examples are exemplary. The basic concepts and methods set forth in this disclosure are not to be construed as limiting with respect to the definition of invention set forth in the following claims.

We claim:

1. A method for calibrating the position of a terminal control frame of a robot end-effector such as a camera or gripping device which is coupled to a robot distal link having a robot distal frame and being subject to control of a computer data processing and storage means, said method comprising the steps of:
   (a) attaching pointing means having a pointing end to the robot distal link such that the pointing means is aligned parallel with a z-axis of the robot distal frame;
   (b) selecting a first reference point in a space removed from the robot but within an operating distance;
   (c) moving the robot to a first pose wherein the pointing end of the pointing means is located at the first reference point;
   (d) storing robot positioning data representing the first robot pose of step "c" in the computer means for later recall and comparison;
   (e) attaching the end-effector to the distal link;
   (f) identifying a reference point on the end-effector;
   (g) moving the robot to a second pose wherein the end-effector reference point is located at the first reference point;
   (h) storing robot positioning data representing the second robot pose of step "g" in the computer means for later recall and comparison;
   (i) comparing the stored positioning data of steps "d" and "h" for detection of differences;
   (j) processing detected differences within the computer means to define offset position of the terminal control frame with respect to the robot distal frame.

2. A method as defined in claim 1, comprising the more specific steps of:
   attaching to the distal link an elongate pointer having a distal contact end;
   identifying a first reference point on a fixed target object; and
   moving the robot to a first pose wherein the contacting end of the pointer is located at the first reference point on the target object.

3. A method as defined in claim 1, comprising the further steps of:
   (k) selecting an additional reference point in a space removed from the robot but within an operating distance;
   (l) moving the robot to a first pose wherein the pointing end of the pointing means is located at said additional reference point;
   (m) storing robot positioning data representing the first robot pose of step "l" in the computer means for later recall and comparison;
   (n) moving the robot to a second pose wherein the end-effector reference point is located at the first reference point;
   (o) storing robot positioning data representing the second robot pose of step "n" in the computer means for later recall and comparison;
   (p) comparing the stored positioning data of steps "m" and "o" for detection of differences;
   (q) processing the detected differences of step "p" within the computer means to define an offset position of the terminal control frame with respect to the robot distal frame.

4. A method as defined in claim 3, wherein the stated steps are repeated a sufficient number of times to develop a statistical base of difference values which may be processed to define a more accurate definition of the offset position of the terminal control frame.

5. A method as defined in claim 1 for calibrating relative orientation of the terminal control frame of a robot end effector with respect to the robot distal frame, comprising the steps of:
   (aa) selecting a second reference point in a space removed from the robot but within an operating distance;
   (bb) moving the robot to a first pose wherein the pointing end of the pointing means is located at the second reference point;
   (cc) storing robot positioning data representing the first robot pose of step "bb" in the computer means for later recall and comparison;
   (dd) processing the stored positioning data for the first and second reference points to identify an orientation vector for a line connecting the first and second reference points;
   (ee) storing vector orientation data relating to the terminal control frame in the computer means for later recall and processing;
   (ff) moving the robot to a third pose such that the orientation of the vector relative to terminal control frame can be defined;
   (gg) storing robot positioning data representing the third robot pose of step "ff" in the computer means for later recall and comparison; and
   (hh) processing the stored data to define the relative orientation of the terminal control frame with respect to the terminal distal frame.

6. A method as defined in claim 5, further comprising the additional steps of repeating movement, storing and processing steps as defined in claim 5 with respect to other robot poses to define additional statistical base for improvement for accuracy orientation definition.

7. A method for improving orientation and/or location accuracy of a programmable robot with respect to a target, said method comprising the steps of:

(a) positioning the robot with respect to the target, said robot having a terminal operating end-effector, said robot being capable of movement between a variety of different positions with respect to the target;

(b) identifying a plurality of separated reference positions external from the robot;

(c) developing identification data defining geometries and spatial data of the separated reference positions relative to the target;

(d) storing the identification data for each respective reference position within a data processing unit for recall and comparison by the robot upon later excursion to a location near such reference position;

(e) moving the robot end-effector to a first location near one of the reference positions, referred to herein as the calibration position, wherein a sensor coupled to the robot detects the presence of the calibration position;

(f) comparing the detected calibration position with the originally stored information data relating to that position;

(g) developing a rigid body error correction based on position differences detected in the previous comparison step, said correction to be used with respect to later moves of the robot relative to the calibration position;

(h) storing the rigid body error correction within the data processing unit;

(i) moving the end-effector to a second reference position utilizing the originally stored identification data regarding the second reference position and applying the rigid body correction developed with respect to the calibration position to more accurately predict proper placement of the robot in approximate vicinity to the second reference position.

8. A method as defined in claim 7, comprising the additional steps of:

(j) detecting the second reference position;

(k) comparing the detected second reference position with respect to the predicted second position to which the robot has been moved in step "i"

(l) detecting differences between the predicted position and actual position of the second reference position detected in step "j";

(m) processing the detected differences to define the amount of correction required to properly position the end-effector at subsequent reference positions;

(n) storing the defined correction within the data processing unit.

9. A method as defined in claim 8, further comprising the additional steps of repeating movement, detection, storing and processing steps as set forth in claim 8 with respect to additional reference positions to define a statistical base for accurately quantifying and averaging position deviation between predicted and actual positions of subsequent reference positions.

10. A method as defined in claim 9, further comprising the initial step of quantifying and storing identification data within the data processing unit regarding geometric configuration and orientation of each reference feature on the target object, as well as their relative separation and orientation between features, for later recall and comparison upon actual detection of each reference feature as a reference position.

11. A method as defined in claim 8, further comprising the additional steps of repeating movement, detection, storing and processing steps as set forth in claim 8 with respect to additional reference positions to define parameters of an analytical model to enable accurate prediction of robot position with respect to subsequent reference positions.

12. A method as defined in claim 7, wherein step "b" comprises the more specific step of identifying a plurality of separated reference features external from the robot which, are positioned on a target object.

13. A method for mapping robot inaccuracy of a programmable robot, said method comprising the steps of:

(a) preparing a target object having a plurality of identifiable features thereon which can serve as reference points for mapping;

(b) developing a feature database defining geometries and spatial relationships of the features on the object in sufficient detail to enable individual recognition of each feature;

(c) storing the feature database in a computer for later recall and comparison;

(d) positioning the target object within operational reach of a distal link of the robot;

(e) attaching sensing means at the distal link capable of detecting the stored features based on a comparison of sensory data with data in the feature database;

(f) calibrating the sensing means with respect to the distal link to accurately define relative positioning of a distal frame with respect to a terminal control frame of the sensing means;

(g) storing the calibrated terminal control frame position within the computer for later recall and comparison;

(h) preparing a routine which correlates stored feature database information with the calibrated terminal control frame position and provides drive commands to the robot for moving the sensing means sequentially to predicted positions of the respective features;

(i) activating the routine to move the sensing means to a calibrating feature comprising one of the stored features on the target object;

(j) defining the relative pose error of the actual position of the sensing means with respect to the predicted position to provide rigid body correction data;

(k) storing the rigid body correction data within the computer for later recall and comparison;

(l) correlating the stored rigid body correction data with the prepared routine to define a new predicted position for a next feature to which the sensing means will be moved;

(m) moving the sensing means to the new predicted location of next feature;

(n) defining the relative pose error of the actual position of the sensing means with respect to the new predicted position;

(o) storing the error data of step "n" within the computer for later recall and comparison;

(p) repeating steps l through o with respect to each subsequent feature to develop a map of the target object based on error data measured;

(q) processing the map error data to define an expression representing robot inaccuracy.

14. A method for improving orientation and/or location accuracy of a programmable robot with respect to an operation to be performed on a target object, said method comprising the steps of:
  (a) preparing a routine which provides drive commands to the robot for moving an attached sensing means to an approximate position of a desired feature on the target object;
  (b) calibrating a sensory reference frame which defines a relative position for the sensing means with respect to the robot;
  (c) activating the routine such that the robot sensing means detects the feature and produces sensory data regarding feature position;
  (d) develop a transformation matrix which relates position of the feature to the sensory reference frame;
  (e) determine a sensory frame pose for the robot based on the matrix of step "d", sensory reference frame position and geometry of the feature;
  (f) determine a set of joint coordinates for the robot corresponding to the sensor frame pose;
  (g) identifying control points along a path of operation representing regions of movement limitation for the robot;
  (h) modifying the routine and defined path of operation with control points to maintain path conformity for free movement of the robot; and
  (i) activating the modified routine to perform the operation.

15. A method for improving orientation and/or location accuracy of a programmable robot with respect to a target, said method comprising the steps of:
  (a) calibrating the position of a terminal control frame of a robot end-effector which is coupled to a robot distal link having a robot distal frame to define their relative position and orientation;
  (b) identifying a plurality of separated reference positions external from the robot;
  (c) developing identification data defining geometries and spatial data of the separated reference positions relative to the target;
  (d) storing the identification data for each respective reference position within a data processing unit for recall and comparison by the robot upon later excursion to a location near such reference position;
  (e) moving the robot end-effector to a first location near one of the reference positions, referred to herein as the calibration position, wherein a sensor coupled to the robot detects the presence of the calibration position;
  (f) comparing the detected calibration position with the originally stored information data relating to that position;
  (g) developing a rigid body error correction based on position differences detected in the previous comparison step, said correction to be used with respect to later moves of the robot relative to the calibration position;
  (h) storing the rigid body error correction within the data processing unit;
  (i) moving the end-effector to a second reference position utilizing the originally stored identification data regarding the second reference position and applying the rigid body correction developed with respect to the calibration position to more accurately predict proper placement of the robot in approximate vicinity to the second reference position.

* * * * *